United States Patent [19]
Corvin et al.

[11] Patent Number: 5,691,888
[45] Date of Patent: Nov. 25, 1997

[54] POWER CONTROLLING UNIT FOR A TROLLEY POLE SWITCH CONTROLLER

[75] Inventors: John H. Corvin, Greer; Charles C. Siegling, III, Greenville, both of S.C.; Francis A. Launier, Laval, Canada

[73] Assignee: Westinghouse Air Brake Company, Wilmerding, Pa.

[21] Appl. No.: 644,406

[22] Filed: May 1, 1996

[51] Int. Cl.$^6$ .............................. H02M 1/08; E01B 7/10; B60M 1/18
[52] U.S. Cl. ............................. 363/65; 191/38; 191/37; 246/419; 246/468
[58] Field of Search .......................... 323/908; 363/56, 363/68, 50, 65; 191/37, 38; 246/419, 418, 460, 468, 462

[56] References Cited

U.S. PATENT DOCUMENTS

| | | | |
|---|---|---|---|
| 5,297,661 | 3/1994 | Tschurbanoff | 191/38 |
| 5,390,772 | 2/1995 | Ta et al. | 191/38 |

*Primary Examiner*—Peter S. Wong
*Assistant Examiner*—Shawn Riley
*Attorney, Agent, or Firm*—James Ray & Associates

[57] ABSTRACT

A power controlling unit for use with a radio board of a trolley pole switch controller is disclosed. The trolley pole switch has at least one frog for switching the path of travel that an energy collector takes through a junction of catenaries. The power controlling unit includes three reduction stages, a chopper control stage, and two output stages. A first reduction stage reduces power received from one catenary to an initial power level. The chopper control stage outputs two pairs of alternating signals. Controlled by a first pair of alternating signals, a second reduction stage reduces the initial power level to a secondary power level to operate the radio board. As long as it receives the initial power level, the third reduction stage reduces the secondary power level to a primary power level to operate the power controlling unit. Controlled by a second pair of alternating signals and the initial power level, when a turn output stage receives a turn command from the radio board, it switches power from one catenary to a turn solenoid of such frog thereby switching the path of travel that the energy collector will take to a turn catenary. Controlled by the second pair of signals and the initial power level, when a straight output stage receives a straight command from the radio board, it switches power from one catenary to a straight solenoid of such frog thereby switching the path of travel that the energy collector will take to a straight catenary.

20 Claims, 8 Drawing Sheets

POWER CONTROLLING UNIT FOR A TROLLEY POLE SWITCH CONTROLLER

CROSS-REFERENCE TO RELATED APPLICATIONS

This application is related to copending applications Ser. Nos. 08/644,402 and 08/641,439, entitled Electronic Controller For A Trolley Pole Switch Mechanism and Signal Processing Unit For A Trolley Pole Switch Controller, respectively, both sharing the same filing date of the present application, May 1, 1996, and filed currently herewith. These patent applications are assigned to the assignee of the present invention, and the teachings therein are incorporated into the present application by reference thereto.

FIELD OF THE INVENTION

The present invention generally relates to a trolley pole switch for switching the path of travel of an energy collector assembly of a trolley pole at a junction of diverging power conduits. More particularly, the present invention is concerned with a power controlling unit for a trolley pole switch controller.

BACKGROUND OF THE INVENTION

As is well known in the trolley vehicle art, an electrically powered trolley vehicle receives the energy needed for its operation from an overhead catenary or a similar power conduit. Mounted atop the trolley vehicle is a trolley pole to which is attached at one end an energy collector assemble. The energy collector assembly rides along the power conduit, or "trolley line" as it is often called, as the trolley vehicle travels along its route of travel. The energy is conveyed to the power conduit through the energy collector assembly of the trolley pole and ultimately delivered to a propulsion unit and other energy consuming devices located on the trolley vehicle.

Also well known in the trolley vehicle art is the operation of a trolley pole switch mechanism (hereinafter "trolley pole switch"). A trolley pole switch is a device situated at a junction of diverging power conduits located above the point where the routes of travel of the trolley vehicle diverge in different directions. The trolley pole switch is used to switch the path of travel that the energy collector assembly of the trolley pole takes at a junction of diverging power conduits. A junction of diverging power conduits may consist of one power conduit strung in a straight path and another power conduit diverging therefrom strung in a path heading to a generally left direction. Likewise, such a junction may consist of one power conduit strung in a straight path and another diverging therefrom strung in a path heading to a generally right direction.

As a trolley vehicle approaches a junction, the trolley pole switch may be commanded to switch the path that the energy collector assembly will travel from the power conduit strung in a straight path to either of the power conduits strung in the left or right direction. When the trolley vehicle seeks to proceed through a junction in a straight path, the trolley pole switch, as explained below, may or may not have to be commanded to switch the path to assure that the energy collector proceeds therethrough on the power conduit strung in the straight path. The route of travel of the trolley vehicle, of course, always corresponds to the path of travel that the energy collector assembly follows through trolley pole switch and thereafter on the power conduit to which it is directed.

The typical trolley pole switch has two switching elements, or "frogs" as they are often called. A frog of the type that is controllable by the instant invention is described in U.S. Pat. No. 5,390,772 to Ta et al., incorporated herein by reference. Each frog, as described in Ta et al., of the typical trolley pole switch, contains an electrical operator such as a solenoid. When the solenoid of one frog is energized, it acts upon certain elements within that frog to switch the path that the energy collector assembly will travel through that frog from the straight power conduit to one power conduit diverging from the straight power conduit. Likewise, when the solenoid of the other frog is energized, it acts to switch the path that the energy collector assembly will travel through that frog from the straight power conduit to another power conduit diverging from the straight power conduit. Still referring to the one-solenoid frog described in U.S. Pat. No. 5,390,772, as the energy collector assembly rides through that frog, it engages a deflector arm which mechanically resets the frog to permit travel therethrough in a straight path. Consequently, the next trolley vehicle that wishes to proceed through that frog on the straight power conduit may do so without the need for any switching of the path.

Various other frogs are configured so that, when the solenoid is energized, the energy collector assembly will travel straight through that frog on the straight power conduit. The energy collector assembly, as it rides through this type of frog, then engages the deflector arm which mechanically resets the frog to permit travel therethrough from the straight power conduit to a left or right diverging power conduit. The next trolley vehicle that wishes to proceed through the frog on the straight power conduit must then energize the solenoid to switch the path.

Certain other types of frogs, however, do not reset mechanically and must be reset via a separate solenoid. These types of frogs thus contain two solenoids. When one solenoid of the two-solenoid frog is energized, it acts to switch the path that the energy collector assembly will travel from the straight power conduit to one of the power conduits diverging therefrom. When the other solenoid of the two-solenoid frog is energized, it acts to switch the path that the energy collector assembly will travel back to the straight power conduit. Consequently, the next trolley vehicle that wishes to proceed through the two-solenoid frog may be required to switch the path so as to assure it will proceed in the direction it intends.

The trolley pole switch alters the path of travel that the energy collector assembly takes therethrough in response to commands received from a controller unit. As described in greater detail in the ensuing paragraphs, the controller unit controls the operation of the trolley pole switch by energizing the frog solenoids. Located in proximity to the trolley pole switch, the controller unit receives signals from a transmitter disposed on a trolley vehicle. The transmitted signals are indicative of a request for the energy collector assembly to proceed through the trolley pole switch in a straight path or veer through it onto either a right path or a left path. The transmitted signals are frequency modulated having resting frequencies centered at 9.2 kHz for a left turn, 11.5 kHz to proceed straight, and 14.0 kHz for a right turn. As a trolley vehicle approaches a junction of diverging power conduits, an operator aboard the trolley vehicle chooses the route of travel that the trolley vehicle is to take at the upcoming junction. The route of travel is chosen via levers or like implements, located in a cab of the trolley vehicle, through which the left, the right or the straight path through the junction may be selected. When a particular route of travel is chosen and its corresponding implement manipulated, the transmitter on the trolley vehicle transmits the appropriate signal to the controller unit. The controller unit receives the signal and generates in response thereto a signal to energize the appropriate solenoid on the trolley pole switch situated at the upcoming junction. The solenoid then acts upon certain elements of the frog to switch the path that the energy collector assembly will take through the trolley pole switch. The trolley vehicle then proceeds through the junction on its chosen route of travel.

Trolley pole switch controller units have been in widespread use in the transit industry for several years prior to the present invention. The typical controller unit includes a radio control board and usually a power supply board. The radio control board includes circuitry for receiving and processing the incoming modulated signals so as to generate intermediate command signals each of which indicative of a command to supply power to the appropriate frog solenoid. The power supply board includes power circuitry for stepping down voltage so as to supply the radio control board with power as well as to supply power to the frog solenoids. In response to each of the three command signals received from the radio control board, the current is switched by an appropriate transistor so that trolley line voltage passes from the power conduit to energize the appropriate solenoid. The solenoid then compels the certain frog elements to switch the path that the energy collector assembly will take through the trolley pole switch.

For those certain prior art controller units that do not include a power supply board, the controller unit includes only the radio board and accompanying power supply circuitry for stepping down voltage so as to supply the radio control board with power. The radio control board still includes circuitry for receiving and processing the incoming modulated signals so as to generate the intermediate command signals. The intermediate command signals, though, are used to drive separate high voltage capacity mechanical relays directly. These relays when actuated directly pass the high voltage of the trolley line to energize the appropriate solenoid of the intended frog. The solenoid then compels the certain frog elements to switch the path that the energy collector assembly will take through the trolley pole switch.

The prior art controller unit contains old technology and therefore exhibits the disadvantages inherent to that technology. Experience has shown that the prior art controller unit oftentimes inadvertently energizes the frog solenoids intermittently in response to spurious noise arising from other radio sources. For example, the radio control boards have proven too sensitive to the transmitted signals emanating from other nearby trolley vehicle transmitters and/or too susceptible to the harmonics of those transmitted signals. Such "false tripping" as it is called, if it occurs while a trolley vehicle is passing through a junction, can cause the energy collector assembly to separate or "dewire" from the overhead power conduit. Dewiring at even low speeds can cause a significant amount of damage to the trolley pole switch, the affected energy collector assembly and the overhead catenary on which it rides.

Experience has shown that the power supply board of the prior art controller unit also has its shortcomings. The power supply board serves in part to step down the 450–770 dc voltage present on the power conduit to the 24 dc volt level required for operation of the radio control board. Because the circuitry on the prior art power supply board dissipates approximately 60 watts of heat in stepping down the voltage, the enclosure in which the prior art power supply board is housed requires vents. Though some heat is carried away by air flowing through the vents, moisture suspended in the air tends to condense on the circuitry. The heat and moisture have been shown to promote oxidation of componentry on the power supply board and affect adversely the operation of the prior art controller unit.

Referring again to those certain prior art controller units that include only a radio control board and the accompanying power supply circuitry, experience has shown that the circuitry on those radio boards and the power supply circuitry are oftentimes damaged by surge voltages arising on the trolley line. These surge voltages are passed to the prior art radio control board via the high voltage capacity mechanical relays to which the prior art radio board directly connects.

The prior art controller units have also proven quite vulnerable to cold temperatures. Heating elements or insulation have been used to assure proper operation in cold weather climates.

Other disadvantages relate to the reliability, the size, and the cost of the mechanical elements used in the prior art controller unit. As alluded to previously, the typical power supply circuitry includes mechanical relays for switching power to the frog solenoids. When a relay actuates in response to a command signal received from the radio control board, trolley line voltage passes through the contacts of the relay to energize the appropriate frog solenoid. These mechanical relays, however, are prone to arcing across the contacts due to the high voltages they are required to handle. Arcing tends to damage the relay contacts over time, and excessive arcing has been shown to damage the power supply circuitry. The mechanical nature of the relays and various other components, with all of their attendant parts, further compromises the reliability of the prior art controller unit and imposes higher costs. The size of the relays and other mechanical components, moreover, mandate enclosures large enough to accommodate these bulky components. This too imposes added costs. Consequently, reliability, space and cost constraints alone recommend the present invention.

As will become apparent from the ensuing description, the present invention in a first embodiment provides a power controlling unit that can be used in lieu of the power supply circuitry in those prior art controller units that contain both the radio board and the power supply board. It can also be used in lieu of the power supply circuitry and associated relays for those prior art controller units that do not include a power supply board. In a second embodiment, the present invention may be also be used as a replacement for a power controlling unit described and claimed in the aforementioned application entitled Electronic Controller For A Trolley Pole Switch Mechanism.

The present invention constitutes an advance over prior art power supply circuitry in several respects. First, to switch the path of travel through the trolley pole switch, the instant invention employs semiconductor switching technology to control the switching of high voltage from the power conduit to energize the appropriate frog solenoid. Second, the instant invention steps down trolley line voltage without generating nearly as much heat as prior art power supply boards. Not only does this obviate the need to incorporate vents in the instant invention but also substantially minimizes the likelihood of moisture condensing on the circuitry. Third, the instant invention operates dependably over a wide range of temperatures without need of heating elements or thermal insulation. These and other advantages favor the present invention over prior art power supply boards in terms of cost, space and reliability.

It should be noted that the foregoing background information is provided to assist the reader in understanding the instant invention and any terms of art used herein are not intended to be limited to any specific meaning unless specifically stated otherwise in this specification including the following detailed description.

OBJECTS OF THE INVENTION

It is, therefore, a primary object of the present invention to provide a power controlling unit for a trolley pole switch controller.

Another object of the present invention is to provide a power controlling unit for a trolley pole switch controller that reduces and regulates power received from a power conduit so as to supply a source of regulated power to a radio board of such frog controller to operate same.

Still another object of the present invention is to provide a power controlling unit for a trolley pole switch controller that reduces and regulates power received from a power conduit without generating as much heat as prior art power supply boards.

Even another object of the present invention is to provide a power controlling unit for a trolley pole switch controller that generates far less heat than prior art power supply boards thereby obviating the need for vents to dissipate heat and rendering the power controlling unit less susceptible to the adverse affects of moisture and other contaminants.

A further object of the present invention is to provide a power controlling unit for a trolley pole switch controller that includes surge protection circuitry for protecting the power controlling unit as well as the rest of the frog controller against excessive variations in power from a power conduit.

Yet a further object of the present invention is to provide a power controlling unit for a trolley pole switch controller capable of operating within various environments wherein the temperature can range from −40° to 70° Celsius.

Still a further object of the present invention is to provide a power controlling unit for a trolley pole switch controller that is more reliable, less expensive, and occupies less space than prior art power supply boards.

Even a further object of the present invention is to provide a power controlling unit for a trolley pole switch controller that is implemented primarily through semiconductor technology rather than through traditional componentry.

An additional object of the present invention is to provide a power controlling unit that is compatible with prior art radio boards and can therefore be substituted for a prior art power supply board of a prior art frog controller.

In addition to the objects and advantages of the power controlling unit invention set forth above, various other objects and advantages will become more readily apparent to persons skilled in the trolley vehicle art from the detailed description of the invention, particularly when considered in conjunction with the attached drawings and with the appended claims.

SUMMARY OF THE INVENTION

In a first embodiment, the present invention provides a power controlling unit for use with a radio board of a trolley pole switch controller. The trolley pole switch has at least one frog for switching the path of travel that an energy collector assembly of a trolley pole takes through a junction of power conduits at which a turn power conduit and a straight power conduit diverge from the straight power conduit. The power controlling unit includes a first reduction means, a second reduction means, a third reduction means, a chopper control means, a turn output means and a straight output means. The first reduction means reduces and regulates power received from any one of the power conduits to an initial power level. The chopper control means outputs a first pair of alternating logic signals and a second pair of alternating logic signals. Controlled by the first pair of alternating logic signals, the second reduction means reduces the initial power level received from the first reduction means to a secondary power level usable by the radio board for operation of the radio board. As long as it receives the initial power level, the third reduction means reduces the secondary power level to a primary power level usable by the power controlling unit. Controlled by the second pair of alternating logic signals and the initial power level, when the turn output means receives an intermediate turn command signal from the radio board, it switches power from any one of the power conduits to one electrical operator of such at least one frog thereby switching the path of travel that the energy collector assembly will take to the turn power conduit. Controlled by the second pair of alternating logic signals and the initial power level, when the straight output means receives an intermediate straight command signal from the radio board, it switches power from any one of the power conduits to another electrical operator of such at least one frog thereby switching the path of travel that the energy collector assembly will take to the straight power conduit.

In a second embodiment, the present invention provides a power controlling unit for use with a signal processing unit of an electronic trolley pole switch controller. The trolley pole switch has at least one frog for switching the path of travel that an energy collector assembly of a trolley pole takes through a junction of power conduits at which a turn power conduit and a straight power conduit diverge from the straight power conduit. The power controlling unit includes a first reduction means, a second reduction means, a third reduction means, a chopper control means, a turn output means and a straight output means. The first reduction means reduces and regulates power received from any one of the power conduits to an initial power level. The chopper control means outputs a first pair of alternating logic signals and a second pair of alternating logic signals. Controlled by the first pair of alternating logic signals, the second reduction means reduces the initial power level received from the first reduction means to a secondary power level usable by the signal processing unit for operation of the signal processing unit. As long as it receives the initial power level, the third reduction means reduces the secondary power level to a primary power level usable by the power controlling unit. Controlled by the second pair of alternating logic signals and the initial power level, when the turn output means receives an intermediate turn command signal from the signal processing unit, it switches power from any one of the power conduits to one electrical operator of such at least one frog thereby switching the path of travel that the energy collector assembly will take to the turn power conduit. Controlled by the second pair of alternating logic signals and the initial power level, when the straight output means receives an intermediate straight command signal from the signal processing unit, it switches power from any one of the power conduits to another electrical operator of such at least one frog thereby switching the path of travel that the energy collector assembly will take to the straight power conduit.

DETAILED DESCRIPTION OF THE INVENTION

Figure 1:
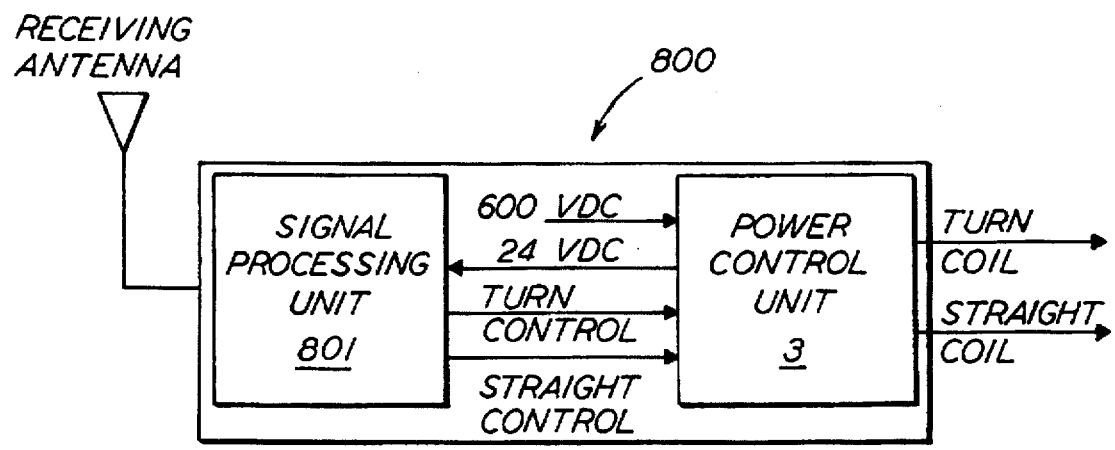
FIG. 1 is a block diagram showing a power controlling unit, according to the present invention, coupled with a radio board of a prior art trolley pole switch controller unit.

Before describing the present invention in detail, for the sake of clarity and understanding, the reader is advised that identical components having identical functions in each of the accompanying drawings have been marked with the same reference numerals throughout each of the several Figures illustrated herein.

In the presently preferred embodiment of the instant invention illustrated in FIG. 1, a power controlling unit 3 of the instant invention incorporates within a prior art controller unit 800 as a replacement for the prior art power supply board formerly contained within the prior art controller unit 800. The power controlling unit 3 not only supplies the power needed to operate a radio board 801 of the prior art controller 800, but also directly controls the switching of power to the frog solenoids of a trolley pole switch in response to command signals received from the prior art radio board 801.

The prior art radio board 801 receives frequency modulated signals, through an antenna, from a transmitter situated on a trolley vehicle. As alluded to previously, the transmitter may transmit any one of three frequency modulated signals. A frequency modulated straight signal indicates a request to switch the path of travel through a frog so that an energy collector assembly rides straight therethrough on a power conduit strung in a straight path. A frequency modulated left turn signal indicates a request to switch the path of travel so that an energy collector assembly rides from the straight power conduit to one strung to a left direction. Likewise, a frequency modulated right turn signal indicates a request to switch the path of travel so that an energy collector assembly rides from the straight power conduit to one strung to a right direction.

The radio board 801 processes the frequency modulated signals to generate intermediate commands signals through which the radio board commands the supply of power to the frog solenoids of the various trolley pole switches. Specifically, the radio board 801 generates an intermediate straight command signal in response to the frequency modulated straight signal. The radio board 801 likewise generates an intermediate turn command signal in response to the frequency modulated turn signal.

The power controlling unit 3 receives the intermediate command signals from the radio board 801. In response to each such intermediate command signal, the power controlling unit 3 supplies power directly to the particular frog solenoid corresponding to the intermediate command signal received, thereby eliminating the need for unreliable mechanical relays. Specifically, in response to the intermediate straight command signal, the power controlling unit 3 switches power directly to a straight frog solenoid. When energized, the straight solenoid acts upon certain elements within that frog to switch the path of travel that the energy collector assembly will take through the frog to the straight power conduit. Likewise, in response to the intermediate turn command signal, the power controlling unit 3 switches power directly to a turn frog solenoid. When energized, the turn solenoid acts upon certain elements within that frog to switch the path of travel that the energy collector assembly will take through the frog to the turn power conduit.

Referring now to FIGS. 2A through 2H, the power controlling unit 3 of the presently preferred embodiment of the instant invention includes a first reduction means 110, a second reduction means 120, a third reduction means 130, a chopper control means 140, a turn output means 150 and a straight output means 170. The power controlling unit 3 of the instant invention is a switching type power supply that regulates its output with transistor switches rather than linear devices common to linear power supplies such as the prior art power supply board.

The voltage potential present on any given trolley line may fluctuate from approximately 450 to 770 volts dc, though typically it averages about 600 volts dc. The first reduction means 110 of power controlling unit 3 reduces this voltage to an initial voltage level of approximately 115 volts dc.

Figure 2A:
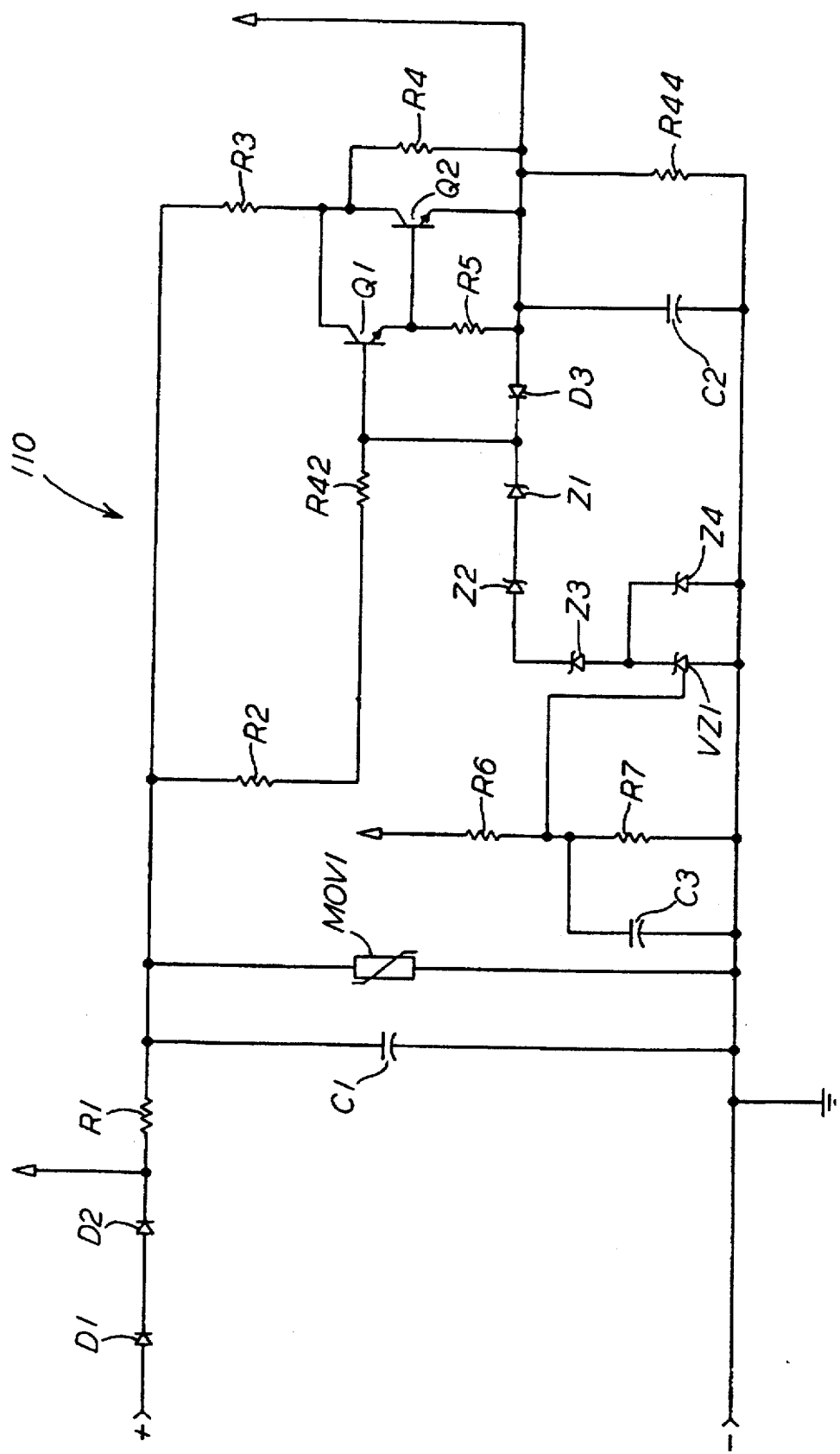
FIG. 2A is a schematic of a first reduction stage of the power controlling unit according to the present invention.

Illustrated in FIG. 2A the first reduction means 110, whose configuration is well known in the electrical arts, includes, among other commonly used components, resistors R1 through R4 and transistors Q1 and Q2. Connected in series with resistor R1 between the trolley line and the collectors of transistors Q1 and Q2, resistor R3 provides a small part of the voltage reduction of the first reduction means 110. Compared to the prior art power supply board, what little energy is lost in the power controlling unit 3 mostly dissipates through resistor R3 which preferably is mounted onto a heat sink.

The first reduction means, or stage 110, also includes overvoltage protection circuitry. The overvoltage protection circuitry for the first reduction stage 110 preferably takes the form of a metal oxide varistor MOV1. Connected in parallel with the first reduction stage 110 between the trolley line and ground as shown in FIG. 2A, MOV1 protects the first reduction stage 110 from surge voltages that may arise on the trolley line.

Controlled by the chopper control stage 140 as described below, the second reduction stage 120 reduces the initial voltage level received from the first reduction stage 110 to a secondary voltage level of approximately 24 volts dc. This 24 volts dc source of power is intended for use by the prior art radio board 801 so that it receives the necessary power to perform its operations.

Figure 2B:
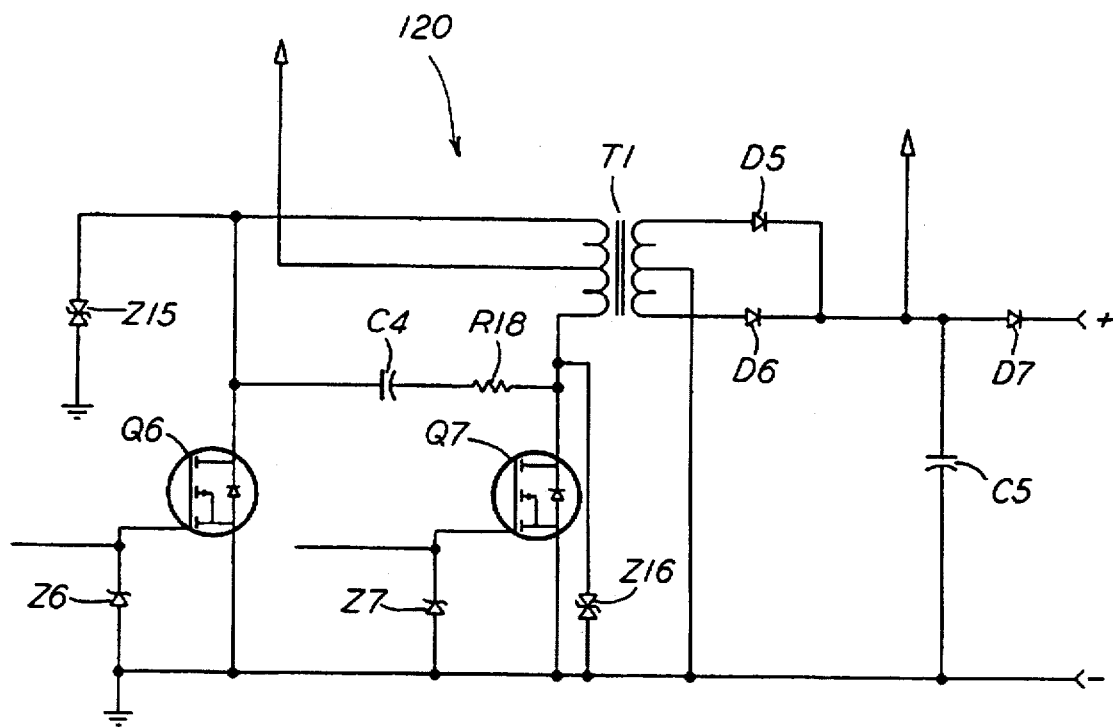
FIG. 2B is a schematic of a second reduction stage of the power controlling unit according to the present invention.

The second reduction stage 120 includes a step down transformer T1, two MOS field effect transistors Q6 and Q7, two rectifier diodes D5 and D6 and a filtering capacitor C5 as shown in FIG. 2B. The step down transformer T1 may be selected from a variety of such devices typically used in such switching power supplies. The center tap of the primary winding of transformer T1 connects to the initial voltage level of 115 volts dc received from the first reduction stage 110. MOSFET Q6 connects between one of the outer leads of the primary winding of transformer T1 and ground. MOSFET Q7 connects between the other of the outer leads of the primary winding of transformer T1 and ground. Each rectifier diode D5 and D6 connects to one of the outer leads of the secondary winding of transformer T1. The center tap of the secondary winding of transformer T1 connects to ground.

MOSFET Q6 switches on each time a high logic signal is received on buffer chopper line A from the chopper control stage 140 as described below. Likewise, MOSFET Q7 switches on each time a high logic signal is received on buffer chopper line B. The rate at which MOSFETs Q6 and Q7 alternately switch on and off depends upon the configuration of the chopper control stage 140. As is well known by practitioners skilled in the electrical arts, by alternately switching the direction of current flow through the primary winding of transformer T1, current flow is induced in the secondary winding through magnetic induction. With the power level reduced via the turns ratio of the step down transformer T1, rectifier diodes D5 and D6 then rectify the positive and negative components of this ac signal to the secondary voltage level of 24 volts dc. The capacitor C5 filters the rectified signal to provide the secondary voltage level intended for the radio board 801.

The second reduction stage 120 also includes transient protection circuitry which preferably takes the form of bidirectional Zener diodes Z15 and Z16. Each diode connects in series between ground and one of the outer leads of the primary winding of transformer T1 as shown in FIG. 2B. Diodes Z15 and Z16 protect the power controlling unit 3 from various adverse electrical influences including the inductive kick of transformer T1 over a range of temperatures.

Figure 2C:
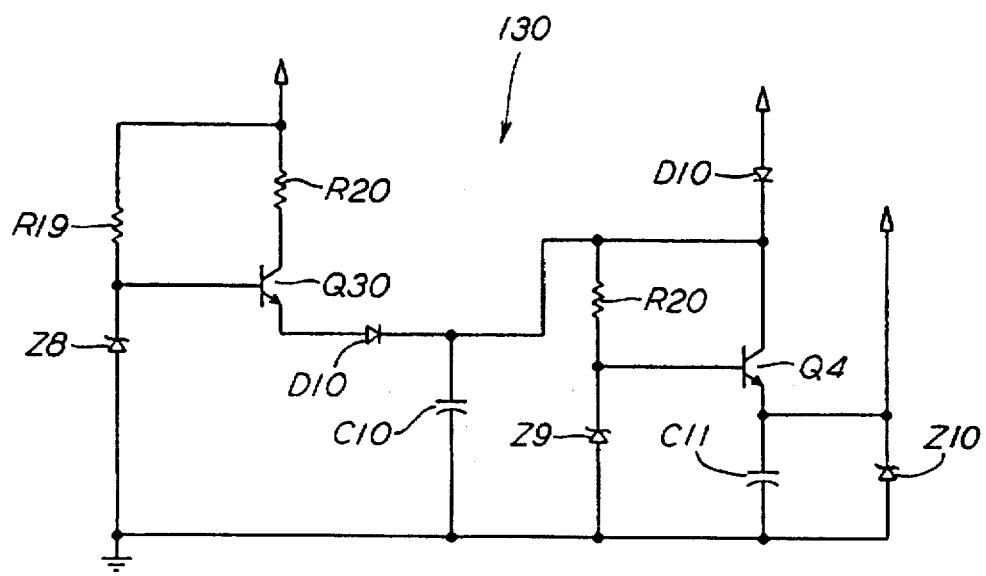
FIG. 2C is a schematic of a third reduction stage of the power controlling unit according to the present invention.

The third reduction stage 130, as shown in FIG. 2C, reduces the secondary voltage level of 24 volts dc received from the second reduction stage 120 to a primary voltage level of approximately 12 volts dc. The third reduction stage 130 converts the secondary voltage level to 12 volts dc as long as the initial voltage level of 115 volts dc is received from the first reduction stage 110. This primary voltage level is made available to supply the power controlling unit 3 with the necessary power to perform its operations.

Though each of the reduction stages 110, 120 and 130 described herein are commonly practiced in the electronic arts, it is their interaction together and their use with the turn output and straight output stages 150 and 170 that sets the instant power controlling unit 3 apart from the prior art power supply board. Moreover, compared to approximately 60 watts dissipated by prior art power control boards, the power controlling unit 3 dissipates merely 2 watts of heat in reducing the trolley line voltage to the voltage levels set forth herein.

Figure 2D:
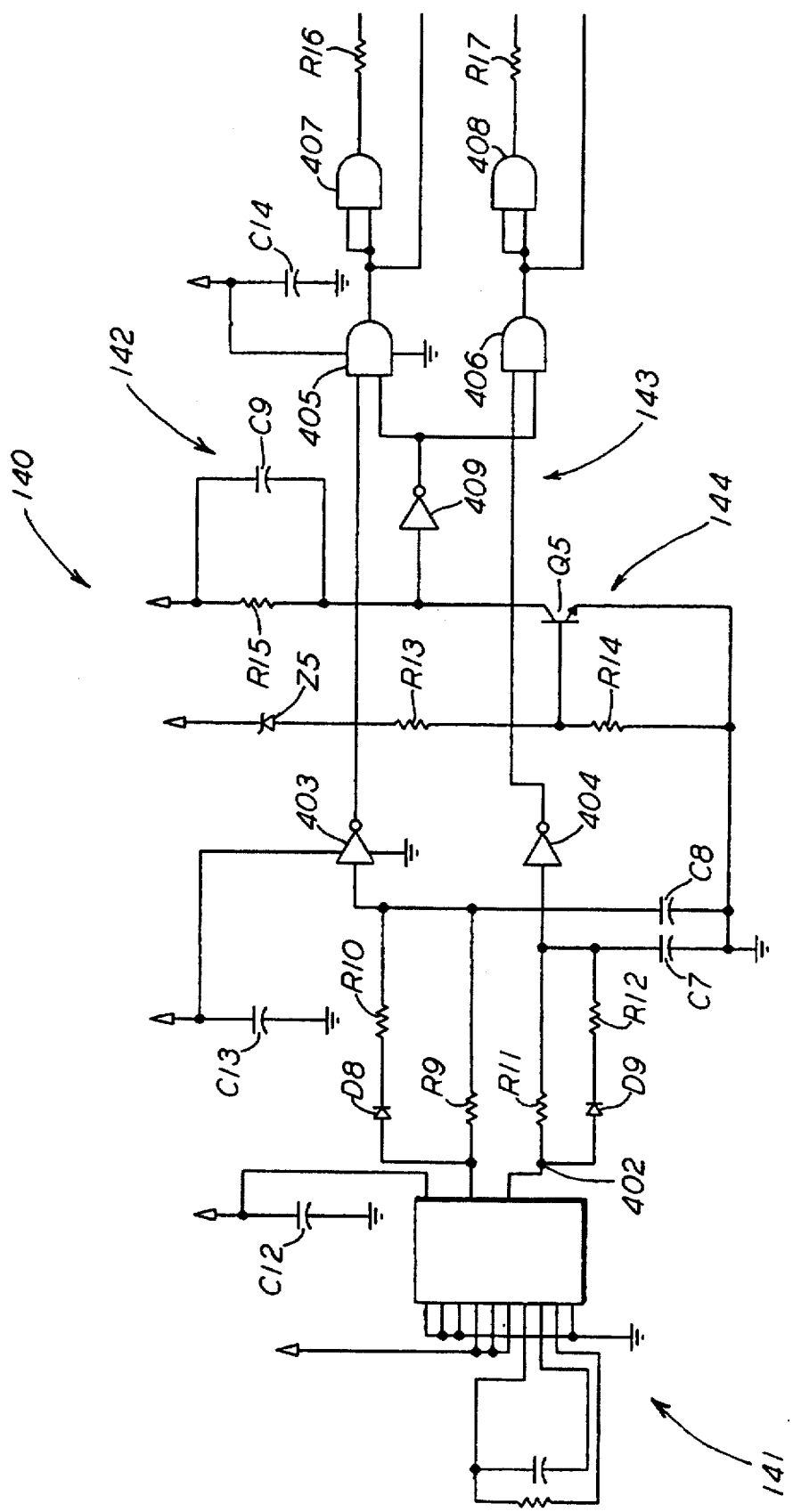
FIG. 2D is a schematic of a chopper control stage of the power controlling unit according to the present invention.

The chopper control stage 140 includes a multivibrator or like oscillator circuit 141, a first logic circuit 142, a second logic circuit 143 and a shut down circuit 144 as illustrated in FIG. 2D. The multivibrator circuit 141 includes a resistor R8, a capacitor C6, a first output 401 that connects to the first logic circuit 142, a second output 402 that connects to the second logic circuit 143. Preferably operating at a fifty percent duty cycle, the multivibrator circuit 141 generates either a high or a low logic signal from each of its outputs but it does so on an alternating basis. Forming the time constant of a resistance-capacitance circuit, the values of resistor R8 and capacitor C6 determine the preset rate at which the high logic signals are alternately dispatched from the outputs of multivibrator circuit 141.

The first logic circuit 142 includes an inverter 403, a first AND gate 405 and a second AND gate 407. Likewise, the second logic circuit 143 includes an inverter 404, a first AND gate 406 and a second AND gate 408. The shut down circuit 144 includes a transistor Q5, resistors R13 and R14, and an inverter 409. Resistors R13 and R14 serve to forward bias, i.e., activate, transistor Q5 as long as the first reduction stage 110 supplies the initial voltage level of 115 volts dc to the shut down circuit 144 as shown in FIG. 2D. Transistor Q5, when activated, passes a low logic signal to the input of inverter 409. Inverter 409 then passes a high logic signal to each of the first AND gates 405 and 407 of the first and second logic circuits 142 and 143, respectively, as long as the first reduction stage 110 supplies the initial voltage level to the shut down circuit 144. The shut down circuit 144 thus disables the chopper control stage 140 when the first reduction stage 110 ceases supplying the initial power level to the shut down circuit 144.

Regarding the operation of the chopper control stage 140, the chopper control stage 140 outputs a first pair of alternating logic signals on buffer chopper lines A and B and a second pair of alternating logic signals on chopper lines A and B. When the multivibrator circuit 141 outputs a high logic signal from its first output 401, the first logic circuit 142 passes a low logic signal on the both the buffer chopper A and chopper A lines. Specifically, inverter 403 inverts the high logic signal received from the first output 401 of the multivibrator circuit 141 thereby passing a low logic signal to the first AND gate 405. Having a low logic signal at one input from inverter 403 and a high logic signal at the other input from the inverter 409 of the shut down circuit 144, AND gate 405 passes a low logic signal on the chopper line A to the turn output and the straight output stages 150 and 170, described below. AND gate 407, having a low logic signal at each of its inputs, then passes a low logic signal on the buffer chopper A line to MOSFET Q6 of the second reduction stage 120 previously described.

While multivibrator circuit 141 outputs the high logic signal from its first output 401, it simultaneously outputs a low logic signal from its second output 402. In response, the second logic circuit 143 passes a high logic signal on the both the buffer chopper B and chopper B lines. Specifically, inverter 404 inverts the low logic signal received from the second output 402 of the multivibrator circuit 141 thereby passing a high logic signal to the second AND gate 406. Having a high logic signal at one input from inverter 404 and a high logic signal at the other input form the inverter 409 of the shut down circuit 144, AND gate 406 passes a high logic signal on the chopper line B to the turn output and the straight output stages 150 and 170, described below. Meanwhile, AND gate 408, having a high logic signal at each of its inputs, passes a high logic signal on buffer chopper line B to MOSFET Q7 of the second reduction stage 120 previously described. It is apparent that AND gate 407 provides a level of buffering between buffer chopper line A and chopper line A as does AND gate 408 between buffer chopper line B and chopper line B.

Multivibrator circuit 141, alternately switching its outputs at the preset rate, then simultaneously outputs a low logic signal from its first output 401 and a high logic signal from its second output 402. The first logic circuit 142 then passes both a high logic signal on buffer chopper line A to MOSFET Q6 of the second reduction stage 120 and a high logic signal on chopper line A to the turn output and the straight output stages 150 and 170. Simultaneously, the second logic circuit 143 then passes both a low logic signal on buffer chopper line B to MOSFET Q7 of the second reduction stage 120 and a low logic signal on chopper line B to the turn output and the straight output stages 150 and 170.

Simply stated, through the first pair of alternating logic signals, the chopper control stage 140 drives the MOS field effect transistors Q6 and Q7, respectively, of the second reduction stage 120. Meanwhile, through the second pair of alternating logic signals, the chopper control stage 140 assists in driving the turn output and straight output stages 150 and 170.

Figure 2E:
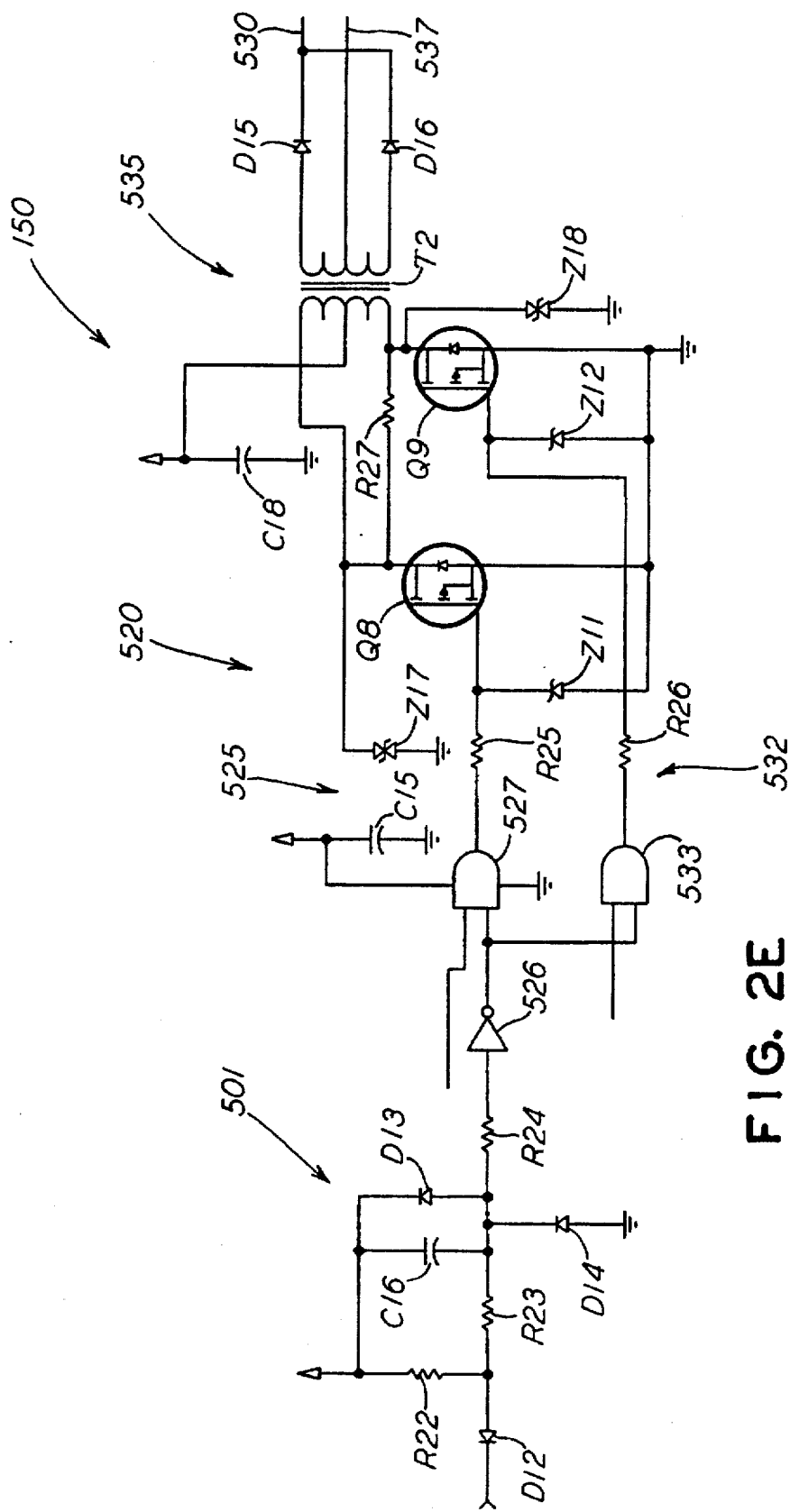
FIGS. 2E and 2F, is a schematic of a turn output stage of the power controlling unit according to the present invention.
Figure 2F:
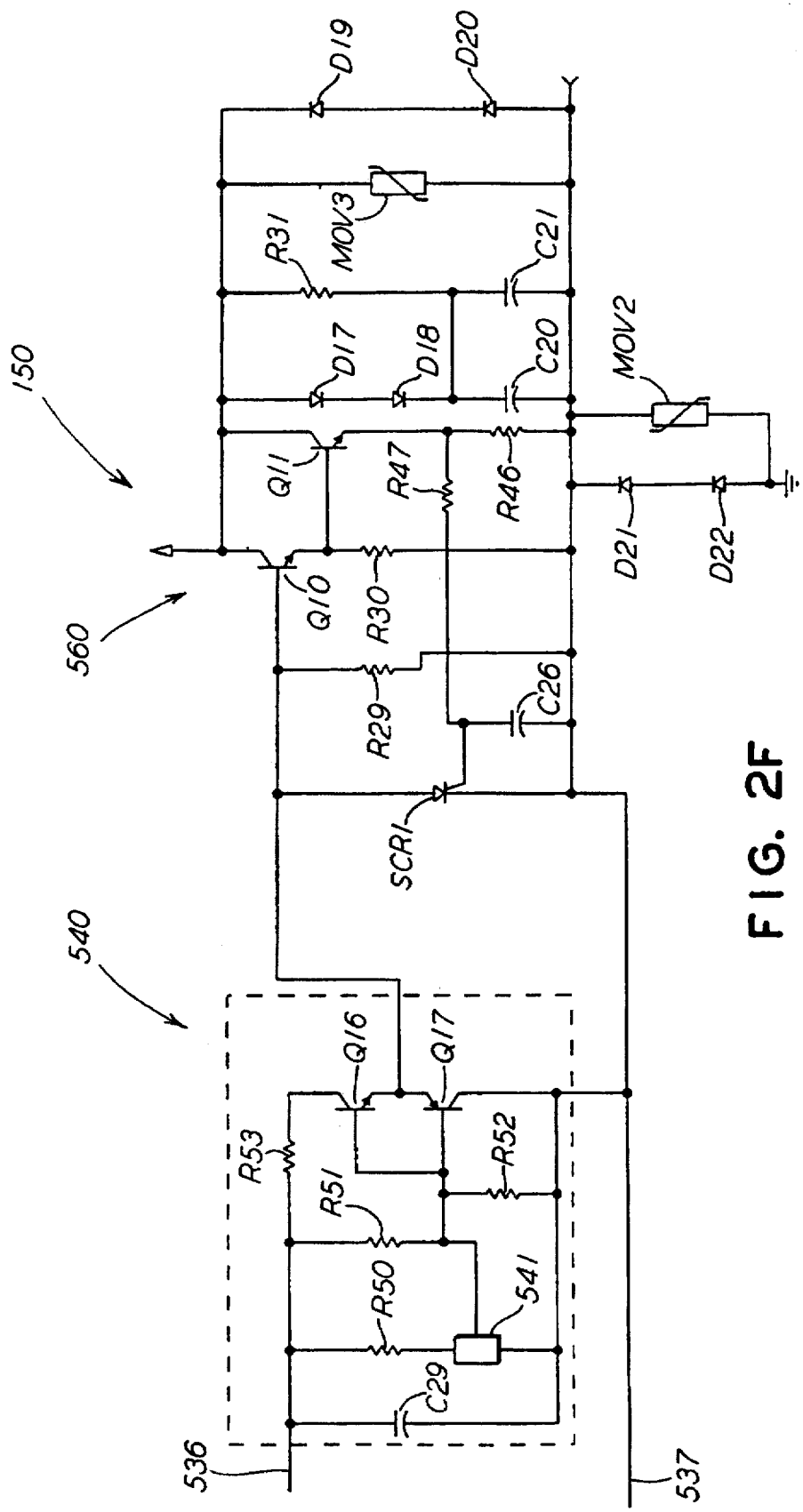

Referring to FIGS. 2E and 2F, the turn output stage 150 includes a turn input circuit 501, a turn chopper circuit 520, a step down transformer circuit 535, a turn output control circuit 540 and a turn solenoid driver circuit 560. Referring specifically to FIG. 2E, the turn input circuit 501 includes resistors R22 and R23, a capacitor C16 and diodes D12, D13 and D14. Supplied with the primary voltage level from the third reduction stage 130, resistor R22 serves as a pull up resistor through which 12 volts dc is supplied via diode D12 to a turn signal output circuit of prior art radio board 801. It is the turn input circuit 501 to which this prior art turn signal output circuit passes the intermediate turn command signal, as described previously. Resistor R22 provides the impedance against which this turn output circuit pulls low via the intermediate turn command signal. Resistor R23 and capacitor C16 provide filtering for the turn input circuit 501. Diodes D13 and D14 protect the turn output stage 150 from excessively high and low variations, respectively, in power level arriving at the input of the turn input circuit 501.

The turn chopper circuit 520 and the transformer T2 essentially provide a power supply which drives both the turn output control circuit 540 and the turn solenoid driver circuit 560. The turn chopper circuit 520 includes a first control circuit 525 and a second control circuit 532. The first control circuit 525 includes an inverter 526, an AND gate 527 and a MOSFET Q8, and the second control circuit 532 includes the inverter 526, an AND gate 533 and a MOSFET Q9. One of the outer leads of the primary winding of transformer T2 connects to MOSFET Q8 whereas the other outer lead connects to MOSFET Q9. The center tap connects to the initial voltage level of 115 volts dc from the first reduction stage 110. Each outer lead of the secondary winding connects via one of two rectifier diodes D15 and D16 to a turn control line 536. The center tap of the secondary winding connects to a turn out line 537. The turn chopper circuit 520 functions much the same way as the combination of the chopper control stage 140 and the second reduction stage 120 described previously.

Regarding the operation of the turn chopper circuit 520, the chopper control stage 140 through the second pair of alternating logic signals and the radio board 801 through the intermediate turn command signal control the operation of the turn chopper circuit 520. In response to these inputs, the turn chopper circuit 520 outputs a third pair of alternating logic signals that controls the operation of the transformer circuit 535. Specifically, when the turn input circuit 501 receives the intermediate turn command signal from the prior art radio board 801, inverter 526 passes a high logic signal to one input of both AND gate 527 and AND gate 533. When the chopper control stage 140 outputs a high logic signal on chopper line A to the other input of AND gate 527, AND gate 527 passes a high logic signal thereby switching on MOSFET Q8 to provide a low impedance path to ground for one end of the primary winding of transformer T2. Simultaneously, chopper control stage 140 outputs a low logic signal on chopper line B to the other input of AND gate 533. AND gate 533 then passes a low logic signal thereby switching off MOSFET Q9 to provide an open circuit for the other end of the primary winding of transformer T2. Rectifier diode D15 then rectifies the resulting ac signal on the turn control line 536.

The chopper control stage 140, alternately switching its outputs at the preset rate, then simultaneously outputs a low logic signal on the chopper line A and a high logic signal on the chopper line B. When an intermediate turn command signal appears at the turn input circuit 501, AND gate 527 passes a low logic signal thereby switching off MOSFET Q8 to provide an open circuit for the other end of the primary winding of transformer T2. Simultaneously, AND gate 533 passes a high logic signal thereby switching on MOSFET Q9 to provide a low impedance path to ground for the one end of the primary winding of transformer T2. Rectifier diode D16 then rectifies the resulting ac signal induced in the secondary winding and passes the rectified signal on the turn control line 536.

From the foregoing, it is apparent that the voltage level present on the turn control line 536 (hereinafter "turn control voltage") of the turn chopper circuit 520 is approximately equal to that on the turn out line 537 (hereinafter "turn out voltage") as long as no intermediate turn command signal appears at the input to the turn output stage 150. When an intermediate turn command signal does appear, however, it is equally apparent that the turn control voltage will be a predetermined amount higher than the turn out voltage. The relative voltages levels carried by the turn control and turn out lines 536 and 537 control the operation of the remainder of the turn output stage 150 as described below.

Referring now to FIG. 2F, the turn output control circuit 540 of the turn output stage 150 includes transistors Q16 and Q17 and a voltage monitor 541. The turn solenoid driver circuit 560 includes driver transistors Q10 and Q11.

Regarding the operation of the turn output control circuit 540 as it controls the turn solenoid driver circuit 560, voltage monitor 541 senses via input pins 1 and 3 when the turn control voltage is the predetermined amount higher than the turn out voltage. Simply stated, when the turn control voltage is higher than the turn out voltage, voltage monitor 541 open circuits output pin 2 thereby activating transistor Q16. This activates driver transistors Q10 and Q11 of the turn solenoid driver circuit 560 thereby switching the high voltage of the trolley line to the turn solenoid of the trolley pole switch. When so energized, the turn solenoid acts to switch the path of travel that the energy collector assembly will take through the trolley pole switch to the turn power conduit.

Conversely, when the turn control voltage is generally equal to or lower than the predetermined voltage difference, voltage monitor 541 provides a low impedance path from output pin 2 to a common with the turn out line 537 thereby activating transistor Q17. This passes the turn out voltage to the turn solenoid driver circuit 560 which is insufficient to activate driver transistors Q10 and Q11. Trolley line voltage then does not pass to the turn solenoid of the trolley pole switch.

Though it is apparent that the turn output stage 150 could be configured to operate without the turn output control circuit 540, the turn output control circuit 540 assures that the driver transistors Q10 and Q11 of the turn solenoid driver circuit 560 will respond quickly enough over a wide range of temperatures.

Referring still to FIG. 2F, the turn solenoid driver circuit 560 of the turn output stage 150 also includes overcurrent protection circuitry, a snubber circuit and overvoltage protection circuitry. The overcurrent protection circuitry includes resistors R46 and R47, capacitor C26 and a silicon controlled rectifier SCR1. When the voltage at the gate of the SCR1 rises above a preset threshold inherent to SCR1 then SCR1 conducts. When SCR1 conducts, SCR1 presents the turn out voltage to the base of driver transistor Q10 thereby deactivating and therein protecting driver transistors Q10 and Q11 from excessive current. Resistor R46 senses the current flowing from driver transistor Q11. Filtered through resistor R47 and capacitor C26, the excessive current enables SCR1 to conduct. When the voltage across the anode and cathode of SCR1 equalizes, SCR1 no longer conducts and the turn solenoid driver circuit 560 is again ready to operate under the control of the turn output control circuit 540.

The snubber circuit includes resistor R31, capacitors C20 and C27, and diodes D17 and D18. Taken together these components protect the driver transistors Q10 and Q11 from the destructive effects of second breakdown, a phenomenon associated with the excessive loading of bipolar transistors. The turn solenoid driver circuit 560 also includes freewheeling diodes D21 and D22. The turn solenoid as an inductive device temporarily stores energy when energized by the high voltage of the trolley line via the turn solenoid driver circuit 560. When the turn solenoid deenergizes, the residual energy if allowed to flow back uninhibited into the turn solenoid driver circuit 560 might damage driver transistors Q10 and Q11. Diodes D21 and D22 protect these semiconductor switching elements from the discharge of excessive energy, i.e., inductive kickback, from the turn solenoid of the trolley pole switch.

The overvoltage protection circuitry preferably may take the form of metal oxide varistors MOV2 and MOV3. Connected across the output of the turn solenoid driver circuit 560 as shown in FIG. 2F MOV3 protects driver transistors Q10 and Q11 from surge voltages that may arise on the trolley line. Connected across the freewheeling diodes D21 and D22, MOV2 likewise protects them from surge voltages.

Figure 2G:
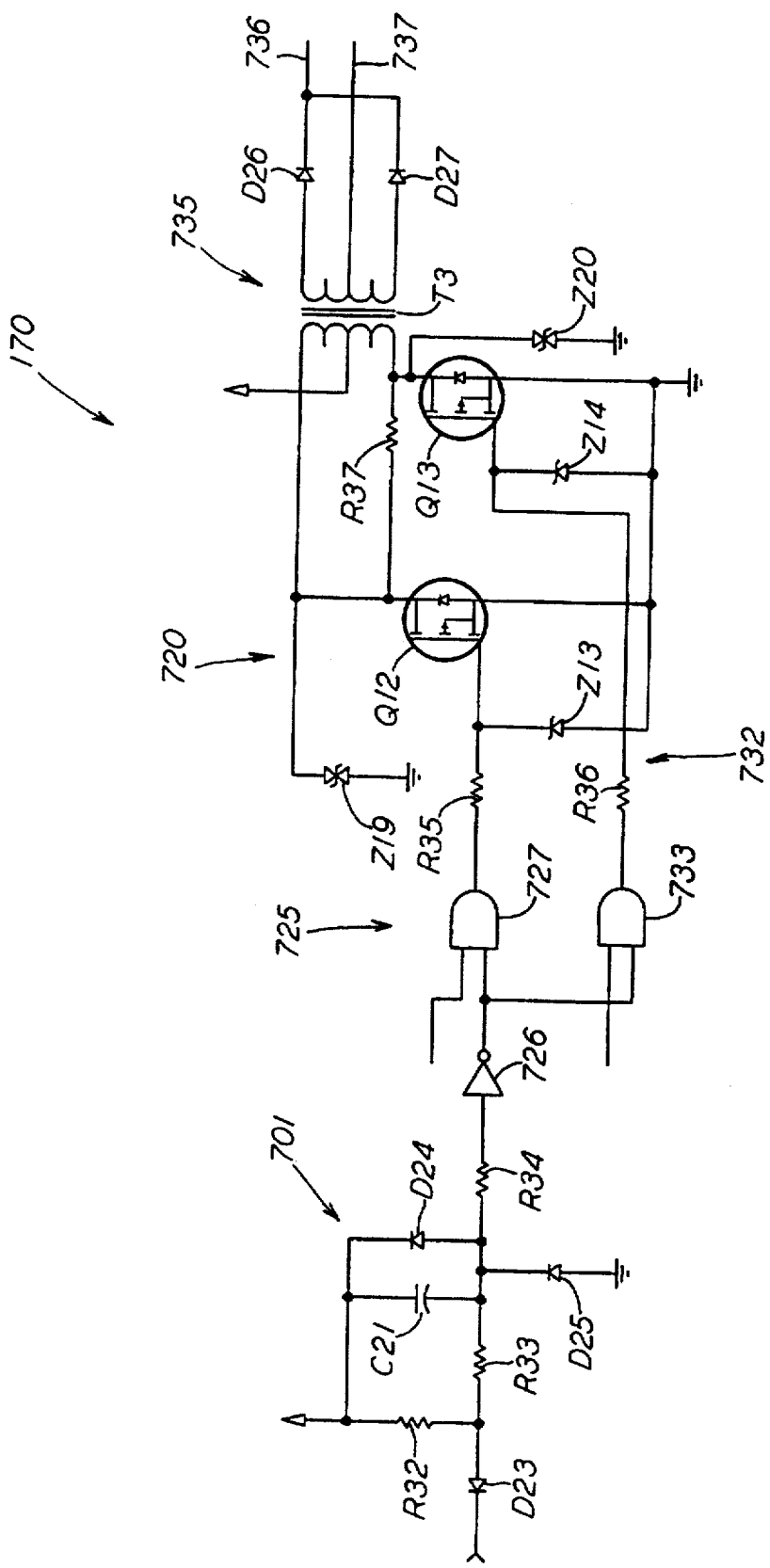
FIGS. 2G and 2H, is a schematic of a straight output stage of the power controlling unit according to the present invention.
Figure 2H:
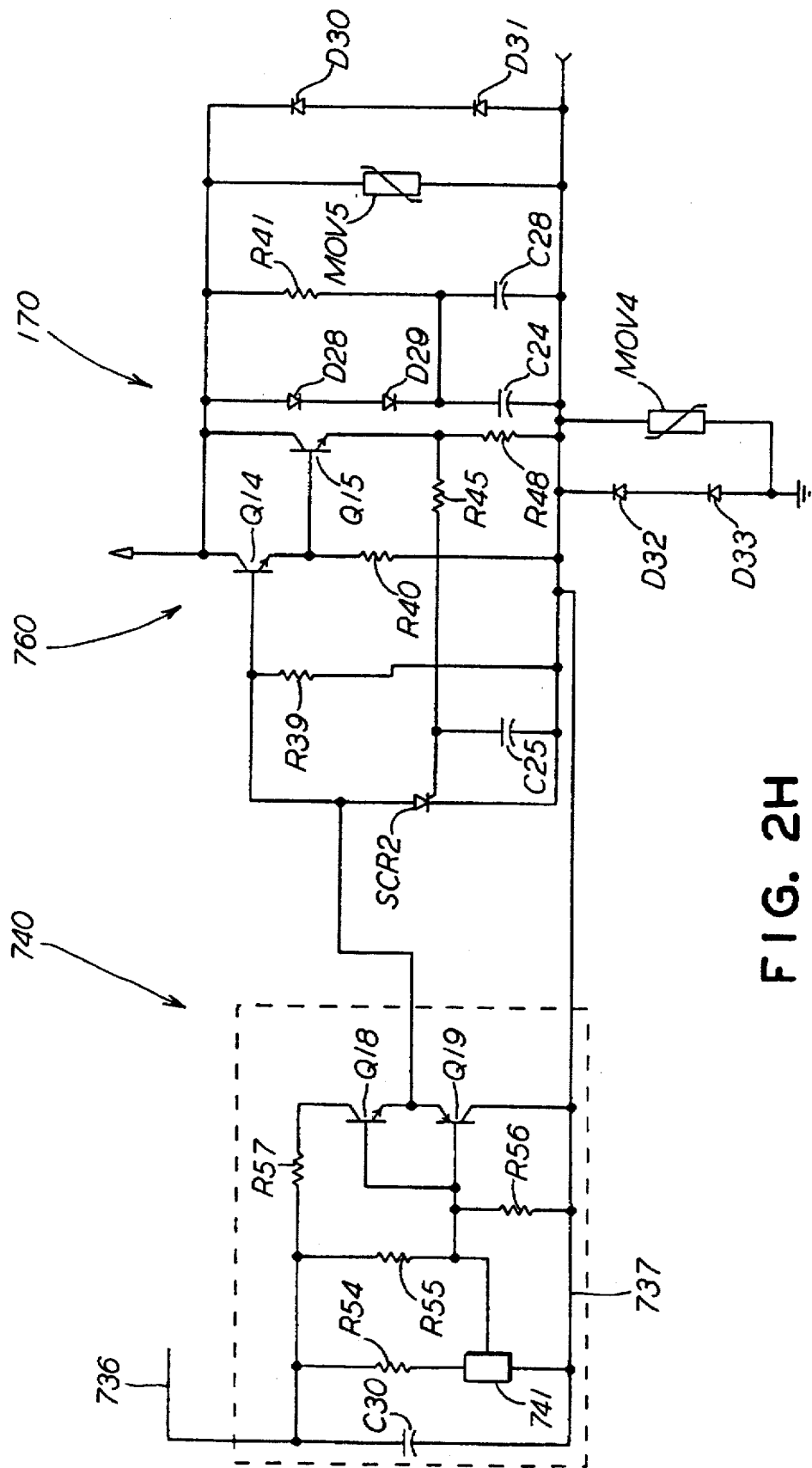

Referring to FIGS. 2G and 2H, the straight output stage 170 includes a straight input circuit 701, a straight chopper circuit 720, a step down transformer circuit 735, a straight output control circuit 740 and a straight solenoid driver circuit 760. Referring specifically to FIG. 2G, the straight input circuit 701 includes resistors R32 and R33, a capacitor C21 and diodes D23, D24 and D25. Supplied with the primary voltage level from the third reduction stage 130, resistor R32 serves as a pull up resistor through which 12 volts dc is supplied via diode D23 to the straight output circuit of prior art radio board 801. It is the straight input circuit 701 to which the prior art straight output circuit passes the intermediate straight command signal, as described previously. Resistor R32 provides the impedance against which the straight output circuit pulls low via the intermediate straight command signal. Resistor R33 and capacitor C21 provide filtering for the straight input circuit 701. Diodes D24 and D25 protect the straight output stage 170 from excessively high and low variations, respectively, in power level arriving at the input of the straight input circuit 701.

The straight chopper circuit 720 and the transformer T3 essentially provide a power supply which drives both the straight output control circuit 740 and the straight solenoid driver circuit 760. The straight chopper circuit 720 includes a first control circuit 725 and a second control circuit 732. The first control circuit 725 includes an inverter 726, an AND gate 727 and a MOSFET Q12, and the second control circuit 732 includes the inverter 726, an AND gate 733 and a MOSFET Q13. One of the outer leads of the primary winding of transformer T3 connects to MOSFET Q12 whereas the other outer lead connects to MOSFET Q13. The center tap connects to the initial voltage level of 115 volts dc from the first reduction stage 110. Each outer lead of the secondary winding connects via one of two rectifier diodes D26 and D27 to a straight control line 736. The center tap of the secondary winding connects to a straight out line 737. The straight chopper circuit 720 functions much the same way as the combination of the chopper control stage 140 and the second reduction stage 120 described previously.

Regarding the operation of the straight chopper circuit 720, the chopper control stage 140 through the second pair of alternating logic signals and the radio board 801 through the intermediate straight command signal control the operation of the straight chopper circuit 720. In response to these inputs, the straight chopper circuit 720 outputs a fourth pair of alternating logic signals that controls the operation of the transformer circuit 735. Specifically, when the straight input circuit 701 receives the intermediate straight command signal from the prior art radio board 801, inverter 726 passes a high logic signal to one input of both AND gate 727 and AND gate 733. When the chopper control stage 140 outputs a high logic signal on chopper line A to the other input of AND gate 727, AND gate 727 passes a high logic signal thereby switching on MOSFET Q12 to provide a low impedance path to ground for one end of the primary winding of transformer T3. Simultaneously, chopper control stage 140 outputs a low logic signal on chopper line B to the other input of AND gate 733. AND gate 733 then passes a low logic signal thereby switching off MOSFET Q13 to provide an open circuit for the other end of the primary winding of transformer T3. Rectifier diode D26 then rectifies the resulting ac signal on the straight control line 736.

The chopper control stage 140, alternately switching its outputs at the preset rate, then simultaneously outputs a low logic signal on the chopper line A and a high logic signal on the chopper line B. When an intermediate straight command signal appears at the straight input circuit 701, AND gate 727 passes a low logic signal thereby switching off MOSFET Q12 to provide an open circuit for the other end of the primary winding of transformer T3. Simultaneously, AND gate 733 passes a high logic signal thereby switching on MOSFET Q13 to provide a low impedance path to ground for the one end of the primary winding of transformer T3. Rectifier diode D27 then rectifies the resulting ac signal induced in the secondary winding and passes the rectified signal on the straight control line 736.

From the foregoing, it is apparent that the voltage level present on the straight control line 736 (hereinafter "straight control voltage") of the straight chopper circuit 720 is approximately equal to that on the straight out line 737 (hereinafter "straight out voltage") as long as no intermediate straight command signal appears at the input to the straight output stage 170. When an intermediate straight command signal does appear, however, it is equally apparent that the straight control voltage will be a predetermined amount higher than the straight out voltage. The relative voltages levels carried by the straight control and straight out lines 736 and 737 control the operation of the remainder of the straight output stage 170 as described below.

Referring now to FIG. 2H, the straight output control circuit 740 of the straight output stage 170 includes transistors Q14 and Q15 and a voltage monitor 741. The straight solenoid driver circuit 760 includes driver transistors Q18 and Q19.

Regarding the operation of the straight output control circuit 740 as it controls the straight solenoid driver circuit 760, voltage monitor 741 senses via input pins 1 and 3 when the straight control voltage is the predetermined amount higher than the straight out voltage. Simply stated, when the straight control voltage is higher than the straight out voltage, voltage monitor 741 open circuits output pin 2 thereby activating transistor Q18. This activates driver transistors Q14 and Q15 of the straight solenoid driver circuit 760 thereby switching the high voltage of the trolley line to the straight solenoid of the trolley pole switch. When so energized, the straight solenoid acts to switch the path of travel that the energy collector assembly will take through the trolley pole switch to the straight power conduit.

Conversely, when the straight control voltage is generally equal to or lower than the predetermined voltage difference, voltage monitor 741 provides a low impedance path from output pin 2 to the straight out line 737 thereby activating transistor Q19. This passes the straight out voltage to the straight solenoid driver circuit 760 which is insufficient to activate driver transistors Q14 and Q15. Trolley line voltage then does not pass to the straight solenoid of the trolley pole switch.

Though it is apparent that the straight output stage 170 could be configured to operate without the straight output control circuit 740, the straight output control circuit 740 assures that the driver transistors Q14 and Q15 of the straight solenoid driver circuit 760 will respond quickly enough over a wide range of temperatures.

Referring still to FIG. 2H, the straight solenoid driver circuit 760 of the straight output stage 170 also includes overcurrent protection circuitry, a snubber circuit and overvoltage protection circuitry. The overcurrent protection circuitry includes resistors R48 and R45, capacitor C25 and a silicon controlled rectifier SCR2. When the voltage at the gate of the SCR2 rises above a preset threshold inherent to SCR2 then SCR2 conducts. When SCR2 conducts, SCR2 presents the straight out voltage to the base of driver transistor Q14 thereby deactivating and therein protecting driver transistors Q14 and Q15 from excessive current. Resistor R48 senses the current flowing from driver transistor Q15. Filtered through resistor R45 and capacitor C25, the excessive current enables SCR2 to conduct. When the voltage across the anode and cathode of SCR2 equalizes, SCR2 no longer conducts and the straight solenoid driver circuit 760 is again ready to operate under the control of the straight output control circuit 740.

The snubber circuit includes resistor R41, capacitors C24 and C28, and diodes D28 and D29. Taken together these components protect the driver transistors Q14 and Q15 from the destructive effects of second breakdown. The straight solenoid driver circuit 760 also includes freewheeling diodes D32 and D33. Diodes D32 and D33 protect driver transistors Q14 and Q15 from the discharge of excessive energy from the straight solenoid of the trolley pole switch.

The overvoltage protection circuitry preferably may take the form of metal oxide varistors MOV4 and MOV5. Connected across the output of the straight solenoid driver circuit 760 as shown in FIG. 2H, MOV5 protects driver transistors Q14 and Q15 from surge voltages that may arise on the trolley line. Connected across the freewheeling diodes D32 and D33, MOV4 likewise protects them from surge voltages.

As noted in the background, the present invention 3 in a second embodiment may be also be used as a replacement for a power controlling unit described and claimed in the aforementioned application entitled Electronic Controller For A Trolley Pole Switch Mechanism. The power controlling unit therein is employed in tandem with a signal processing unit to control the frog solenoids of a trolley pole switch. When the signal processing unit is used with the instant invention 3, the signal processing unit receives the secondary input voltage of 24 volts dc from the second reduction stage 120 to power its operations. The signal processing unit also continuously receives from the instant invention 3 a primary voltage level, i.e., a 12 volt dc reference voltage, directed to the collectors of driver transistors Q1 and Q2 of a turn driver circuit 94 of the signal processing unit. It is the turn input circuit 501 to which this turn driver circuit 94 passes the intermediate turn command signal, as described in the aforementioned application. The signal processing unit likewise continuously receives from the instant invention 3 a 12 volt dc reference voltage directed to the collectors of driver transistors Q3 and Q4 of a straight driver circuit 95 of the signal processing unit. It is the straight input circuit 701 to which this straight driver circuit 95 passes the intermediate straight command signal, as described in the aforementioned application. The operation of the instant invention 3 with the signal processing unit is described in detail in the aforementioned application.

While the preferred embodiments for carrying out the instant invention have been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit the invention in any way.

Accordingly, to promote the progress of science and useful arts, we secure for ourselves by Letters Patent exclusive rights to all subject matter embraced by the following claims for the time prescribed by the Patent Act.

We claim:

1. A power controlling unit for a controller of a trolley pole switch for use with a radio board of such controller, such trolley pole switch having at least one frog for switching the path of travel therethrough of an energy collector assembly of a trolley pole at a junction of power conduits at which a turn power conduit and a straight power conduit diverge from such straight power conduit, said power controlling unit comprising:

(a) a first reduction means for reducing and regulating power received from any one of such power conduits to an initial power level;

(b) a chopper control means for outputting a first pair of alternating logic signals and a second pair of alternating logic signals;

(c) a second reduction means controlled by said chopper control means such that when said second reduction means receives said first pair of alternating logic signals from said chopper control means, said second reduction means reduces said initial power level received from said first reduction means to a secondary power level usable by such radio board for operation of such radio board;

(d) a third reduction means for receiving said secondary power level from said second reduction means and said initial power level from said first reduction means such that said third reduction means reduces said secondary power level to a primary power level usable by said power controlling unit to operate same as long as said initial power level is received from said first reduction means;

(e) a turn output means for receiving said second pair of alternating logic signals from said chopper control means and said initial power level from said first reduction means such that when an intermediate turn command signal is also received from such radio board, said turn output means switches power in response thereto from any one of such power conduits to one electrical operator of such at least one frog thereby switching the path of travel that such energy collector assembly will take through such at least one frog to such turn power conduit; and (f) a straight output means for receiving said second pair of alternating logic signals from said chopper control means and said initial power level from said first reduction means such that when an intermediate straight command signal is also received from such radio board, said straight output means switches power in response thereto from any one of such power conduits to another electrical operator of such at least one frog thereby switching the path of travel that such energy collector assembly will take through such at least one frog to such straight power conduit.

2. The power controlling unit as recited in claim 1 wherein said first reduction means includes surge protection circuitry.

3. The power controlling unit as recited in claim 1 wherein said second reduction means includes transient protection circuitry.

4. The power controlling unit as recited in claim 1 wherein said turn output means includes surge protection circuitry.

5. The power controlling unit as recited in claim 1 wherein said straight output means includes surge protection circuitry.

6. The power controlling unit as recited in claim 1 wherein said turn output means includes:

(a) a turn input circuit for receiving at an input thereof such intermediate turn command signal from such radio board and for protecting said turn output means from excessive variations in power level that may appear at said input;

(b) a turn chopper circuit, controlled by said second pair of alternating logic signals received from said chopper control means, for outputting a third pair of alternating logic signals in response to such intermediate turn command signal received from said turn input circuit;

(c) a step down transformer circuit, controlled by said turn chopper circuit, whose primary winding has one outer lead receiving one of said third pair of alternating logic signals and another outer lead receiving another of said third pair of alternating logic signals and a center tap receiving said initial power level and whose secondary winding has both outer leads conveying a turn control voltage and a center tap conveying a turn out voltage such that when such intermediate turn command signal is received by said turn input circuit, said turn control voltage is a predetermined amount greater than said turn out voltage;

(d) a turn output control circuit for sensing said turn control voltage and said turn out voltage and for outputting a turn control signal when said turn control voltage is said predetermined amount higher than said turn out voltage and for outputting a turn out signal otherwise; and (e) a turn solenoid driver circuit, controlled by said turn output control circuit, such that when said turn control signal is received from said turn output control circuit, said turn solenoid driver circuit switches power from any one of such power conduits to such one electrical operator thereby switching the path of travel that such energy collector assembly will take through such at least one frog to such turn power conduit.

7. The power controlling unit as recited in claim 6 wherein said turn solenoid driver circuit includes surge protection circuitry.

8. The power controlling unit as recited in claim 1 wherein said straight output means includes:

(a) a straight input circuit for receiving at an input thereof such intermediate straight command signal from such radio board and for protecting said straight output means from excessive variations in power level that may appear at said input;

(b) a straight chopper circuit, controlled by said second pair of alternating logic signals received from said chopper control means, for outputting a fourth pair of alternating logic signals in response to such intermediate straight command signal received from said straight input circuit;

(c) a step down transformer circuit, controlled by said straight chopper circuit, whose primary winding has one outer lead receiving one of said fourth pair of alternating logic signals and another outer lead receiving another of said fourth pair of alternating logic signals and a center tap receiving said initial power level and whose secondary winding has both outer leads conveying a straight control voltage and a center tap conveying a straight out voltage such that when such intermediate straight command signal is received by said straight input circuit, said straight control voltage is a predetermined amount greater than said straight out voltage;

(d) a straight output control circuit for sensing said straight control voltage and said straight out voltage and for outputting a straight control signal when said straight control voltage is said predetermined amount higher than said straight out voltage and for outputting a straight out signal otherwise; and (e) a straight solenoid driver circuit, controlled by said straight output control circuit, such that when said straight control signal is received from said straight output control circuit, said straight solenoid driver circuit switches power from any one of such power conduits to such another electrical operator thereby switching the path of travel that such energy collector assembly will take through such at least one frog to such straight power conduit.

9. The power controlling unit as recited in claim 8 wherein said straight solenoid driver circuit includes surge protection circuitry.

10. The power controlling unit as recited in claim 1 wherein said chopper control means includes a shut down circuit that disables said chopper control means when said first reduction means ceases supplying said initial power level to said shut down circuit.

11. A power controlling unit for an electronic controller of a trolley pole switch for use with a signal processing unit of such electronic controller, such trolley pole switch having at least one frog for switching the path of travel therethrough of an energy collector assembly of a trolley pole at a junction of power conduits at which a turn power conduit and a straight power conduit diverge from such straight power conduit, said power controlling unit comprising:

(a) a first reduction means for reducing and regulating power received from any one of such power conduits to an initial power level;

(b) a chopper control means for outputting a first pair of alternating logic signals and a second pair of alternating logic signals;

(c) a second reduction means controlled by said chopper control means such that when said second reduction means receives said first pair of alternating logic signals from said chopper control means, said second reduction means reduces said initial power level received from said first reduction means to a secondary power level usable by such signal processing unit for operation of such signal processing unit;

(d) a third reduction means for receiving said secondary power level from said second reduction means and said initial power level from said first reduction means such that said third reduction means reduces said secondary power level to a primary power level usable by said power controlling unit to operate same as long as said initial power level is received from said first reduction means;

(e) a turn output means for receiving said second pair of alternating logic signals from said chopper control means and said initial power level from said first reduction means such that when an intermediate turn command signal is also received from such signal processing unit, said turn output means switches power in response thereto from any one of such power conduits to one electrical operator of such at least one frog thereby switching the path of travel that such energy collector assembly will take through such at least one frog to such turn power conduit; and (f) a straight output means for receiving said second pair of alternating logic signals from said chopper control means and said initial power level from said first reduction means such that when an intermediate straight command signal is also received from such signal processing unit, said straight output means switches power in response thereto from any one of such power conduits to another electrical operator of such at least one frog thereby switching the path of travel that such energy collector assembly will take through such at least one frog to such straight power conduit.

12. The power controlling unit as recited in claim 11 wherein said first reduction means includes surge protection circuitry.

13. The power controlling unit as recited in claim 11 wherein said second reduction means includes transient protection circuitry.

14. The power controlling unit as recited in claim 11 wherein said turn output means includes surge protection circuitry.

15. The power controlling unit as recited in claim 11 wherein said straight output means includes surge protection circuitry.

16. The power controlling unit as recited in claim 11 wherein said turn output means includes:

(a) a turn input circuit for receiving at an input thereof such intermediate turn command signal from such signal processing unit and for protecting said turn output means from excessive variations in power level that may appear at said input;

(b) a turn chopper circuit, controlled by said second pair of alternating logic signals received from said chopper control means, for outputting a third pair of alternating logic signals in response to such intermediate turn command signal received from said turn input circuit;

(c) a step down transformer circuit, controlled by said turn chopper circuit, whose primary winding has one outer lead receiving one of said third pair of alternating logic signals and another outer lead receiving another of said third pair of alternating logic signals and a center tap receiving said initial power level and whose secondary winding has both outer leads conveying a turn control voltage and a center tap conveying a turn out voltage such that when such intermediate turn command signal is received by said turn input circuit, said turn control voltage is a predetermined amount greater than said turn out voltage;

(d) a turn output control circuit for sensing said turn control voltage and said turn out voltage and for outputting a turn control signal when said turn control voltage is said predetermined amount higher than said turn out voltage and for outputting a turn out signal otherwise; and (e) a turn solenoid driver circuit, controlled by said turn output control circuit, such that when said turn control signal is received from said turn output control circuit, said turn solenoid driver circuit switches power from any one of such power conduits to such one electrical operator thereby switching the path of travel that such energy collector assembly will take through such at least one frog to such turn power conduit.

17. The power controlling unit as recited in claim 16 wherein said turn solenoid driver circuit includes surge protection circuitry.

18. The power controlling unit as recited in claim 11 wherein said straight output means includes:

(a) a straight input circuit for receiving at an input thereof such intermediate straight command signal from such signal processing unit and for protecting said straight output means from excessive variations in power level that may appear at said input;

(b) a straight chopper circuit, controlled by said second pair of alternating logic signals received from said chopper control means, for outputting a fourth pair of alternating logic signals in response to such intermediate straight command signal received from said straight input circuit;

(c) a step down transformer circuit, controlled by said straight chopper circuit, whose primary winding has one outer lead receiving one of said fourth pair of alternating logic signals and another outer lead receiving another of said fourth pair of alternating logic signals and a center tap receiving said initial power level and whose secondary winding has both outer leads conveying a straight control voltage and a center tap conveying a straight out voltage such that when such intermediate straight command signal is received by said straight input circuit, said straight control voltage is a predetermined amount greater than said straight out voltage;

(d) a straight output control circuit for sensing said straight control voltage and said straight out voltage and for outputting a straight control signal when said straight control voltage is said predetermined amount higher than said straight out voltage and for outputting a straight out signal otherwise; and (e) a straight solenoid driver circuit, controlled by said straight output control circuit, such that when said straight control signal is received from said straight output control circuit, said straight solenoid driver circuit switches power from any one of such power conduits to such another electrical operator thereby switching the path of travel that such energy collector assembly will take through such at least one frog to such straight power conduit.

19. The power controlling unit as recited in claim 18 wherein said straight solenoid driver circuit includes surge protection circuitry.

20. The power controlling unit as recited in claim 1 wherein said chopper control means includes a shut down circuit that disables said chopper control means when said first reduction means ceases supplying said initial power level to said shut down circuit.

* * * * *